(12) United States Patent
Petillon

(10) Patent No.: US 10,227,911 B2
(45) Date of Patent: Mar. 12, 2019

(54) METHOD FOR CONTROLLING AN INTERNAL COMBUSTION ENGINE

(71) Applicant: RENAULT s.a.s., Boulogne Billancourt (FR)

(72) Inventor: Yohann Petillon, Montigny le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 22 days.

(21) Appl. No.: 15/320,158

(22) PCT Filed: May 22, 2015

(86) PCT No.: PCT/FR2015/051364
§ 371 (c)(1),
(2) Date: Dec. 19, 2016

(87) PCT Pub. No.: WO2015/193572
PCT Pub. Date: Dec. 23, 2015

(65) Prior Publication Data
US 2017/0138249 A1 May 18, 2017

(30) Foreign Application Priority Data
Jun. 20, 2014 (FR) ..................................... 14 55724

(51) Int. Cl.
*F01P 7/16* (2006.01)
*F02D 41/40* (2006.01)
(Continued)

(52) U.S. Cl.
CPC .............. *F01P 7/167* (2013.01); *F02D 41/10* (2013.01); *F02D 41/1446* (2013.01);
(Continued)

(58) Field of Classification Search
CPC ... F01P 7/167; F01P 2025/08; F02D 41/1446; F02D 41/40
(Continued)

(56) References Cited

U.S. PATENT DOCUMENTS

| 4,825,837 A * | 5/1989 | Nakagawa | .............. F02D 41/14 |
| | | | 123/489 |
| 5,103,791 A | 4/1992 | Tomisawa | |

(Continued)

FOREIGN PATENT DOCUMENTS

| DE | 10 2012 211 527 A1 | 1/2014 |
| WO | WO 99/15769 A1 | 4/1999 |
| WO | WO 03/102394 A1 | 12/2003 |

OTHER PUBLICATIONS

International Search Report dated Oct. 8, 2015, in PCT/FR2015/051364 filed May 22, 2015.
(Continued)

*Primary Examiner* — Mahmoud Gimie
(74) *Attorney, Agent, or Firm* — Oblon, McClelland, Maier & Neustadt, L.L.P.

(57) ABSTRACT

A method for controlling an internal combustion engine includes acquiring, at a first operating point of the engine, a value of a first characteristic parameter of the first operating point, and deducing from the value a first liquid coolant temperature setpoint in the engine and a first richness setpoint of a mixture of air and fuel to be admitted into the engine. The method also includes acquiring, on passing a second operating point different from the first, the value of the parameter and deducing from the value, second setpoints for temperature and richness. When the second temperature setpoint is strictly lower than the first temperature setpoint, the method includes determining an additional richness to be added to the second richness setpoint, acquiring a burned gas (Continued)

temperature, and progressively reducing the additional richness as a function of the burned gas temperature acquired.

11 Claims, 2 Drawing Sheets

(51) Int. Cl.
    *F02D 41/10*     (2006.01)
    *F02D 41/14*     (2006.01)
    *F02D 41/00*     (2006.01)

(52) U.S. Cl.
    CPC .......... *F02D 41/40* (2013.01); *F01P 2025/08* (2013.01); *F02D 41/0007* (2013.01); *F02D 2200/021* (2013.01); *F02D 2200/0414* (2013.01); *F02D 2200/602* (2013.01); *Y02T 10/44* (2013.01)

(58) Field of Classification Search
    USPC ................................ 123/294, 676, 681, 689
    See application file for complete search history.

(56) References Cited

U.S. PATENT DOCUMENTS

| | | | |
|---|---|---|---|
| 6,390,081 B1 | 5/2002 | Novak et al. | |
| 2006/0005790 A1 | 1/2006 | Braun et al. | |
| 2012/0059566 A1* | 3/2012 | Tsunooka et al. | ...... F02D 28/00 701/102 |

OTHER PUBLICATIONS

French Search Report dated Mar. 24, 2015, in French Patent Application 1455724 filed Jun. 20, 2014.

* cited by examiner

METHOD FOR CONTROLLING AN INTERNAL COMBUSTION ENGINE

TECHNICAL FIELD TO WHICH THE INVENTION RELATES

The present invention generally concerns the field of internal combustion engines.

More particularly, it concerns a method for controlling an internal combustion engine wherein

- at a first operating point of the internal combustion engine, the value of a first characteristic parameter of said operating point is acquired, and from this a first liquid coolant temperature setpoint in the internal combustion engine and a first richness setpoint of the mixture of air and fuel to be admitted into the internal combustion engine are deduced,
- on passing a second operating point different from the first operating point, the value of said parameter is acquired and from this, second setpoints for temperature and richness are deduced.

It also concerns an internal combustion engine comprising an engine block, an intake line for introducing fresh air into the engine block and provided with a valve for controlling the flow of fresh air, an exhaust line for discharging the burned gases from the engine block, a line for injecting fuel into the engine block and provided with at least one injector for injecting fuel into the engine block, and a coolant circuit of the engine block provided with a thermostat.

In particular, concerns engines with controlled ignition.

TECHNOLOGICAL BACKGROUND

When the driver presses the accelerator pedal, the internal combustion engine is controlled so as to change the operating point.

The computer of this internal combustion engine to this end calculates new quantities of air and fuel to be injected into the engine cylinders.

In order for this engine to function well, certain thermo-mechanical limits must not be exceeded, such as a rotation speed threshold for the engine drive shaft or a permitted temperature threshold of the engine block.

When an internal combustion engine shifts from one operating point to another following acceleration by the driver, the temperature of the burned gases rises.

It is then necessary to limit this temperature increase in order to prevent the engine from overheating.

Document EP1320669 describes a method in which it is provided to control the temperature of the liquid coolant of the internal combustion engine as a function of the new operating point of the engine.

In particular, it is provided to reduce the liquid coolant temperature when the engine is running under heavy load.

Nonetheless, the liquid coolant temperature of the engine does not vary immediately with the new temperature setpoint imposed. The cooling of the engine block itself has a certain latency period. These two phenomena combined lead to a risk of a temporary rise in the temperature of the engine block beyond the permitted temperature threshold.

OBJECT OF THE INVENTION

In order to remedy the abovementioned drawback of the prior art, the present invention proposes ingeniously controlling the temperature of the liquid coolant and the quantity of fuel injected into the cylinders of the engine block, so as to limit the temperature variations of this engine block.

More particularly, according to the invention, a method is proposed for controlling an internal combustion engine as defined initially, wherein if the second temperature setpoint is strictly lower than the first temperature setpoint, provision is made to perform the following steps:

a) determination of an additional richness to be added to the second richness setpoint, b) acquisition of the burned gas temperature, and c) progressive reduction of the additional richness as a function of the burned gas temperature acquired.

Steps a) to c) are implemented if the liquid coolant temperature setpoint falls, i.e. if there is a risk of the temperature of the engine block exceeding the permitted threshold.

Thanks to the invention, the additional fuel richness injected into the cylinders in step a) has the effect of rapidly blocking the increase in the burned gas temperature.

As a consequence, more fuel is consumed. For this reason, this additional richness is progressively reduced in step c) for the duration necessary to lower the temperature of the liquid coolant to its setpoint.

In this way, the rise in temperature of the engine block is limited and the fuel consumption is reduced.

Further non-limitative and advantageous characteristics of the control method according to the invention are as follows:

- in step c), the value of the reduced additional richness is read from a map as a function of the burned gas temperature;
- in step c), the value of the reduced additional richness is calculated using a controller as a function of the burned gas temperature;
- the controller is a proportional-integral-derivative controller;
- each liquid coolant temperature setpoint is read from a predefined map;
- each liquid coolant temperature setpoint is selected from a first set of separate values;
- the first set comprises at most five separate values;
- the first set comprises three separate values, namely 80° C., 90° C. and 100° C.;
- when the temperature outside the internal combustion engine is greater than a predefined threshold, each liquid coolant temperature setpoint is selected from a second set of values, the lowest value of this second set being greater than the lowest value of the first set.

The invention also proposes an internal combustion engine as defined initially and which comprises a computer able to implement the control method according to the invention and control said control valve, each injector and said thermostat according to the setpoints of the liquid coolant temperature and richness, and taking into account said additional richness.

DETAILED DESCRIPTION OF AN EXEMPLARY EMBODIMENT

The description given below in relation to the attached drawings refers to merely non-limitative examples, and will illustrate clearly the content of the invention and show how it may be implemented.

In the description, the terms "upstream" and "downstream" are used according to the direction of gas flow from the point of intake of fresh air from the atmosphere to the outlet of the burned gas to the atmosphere.

Figure 1:
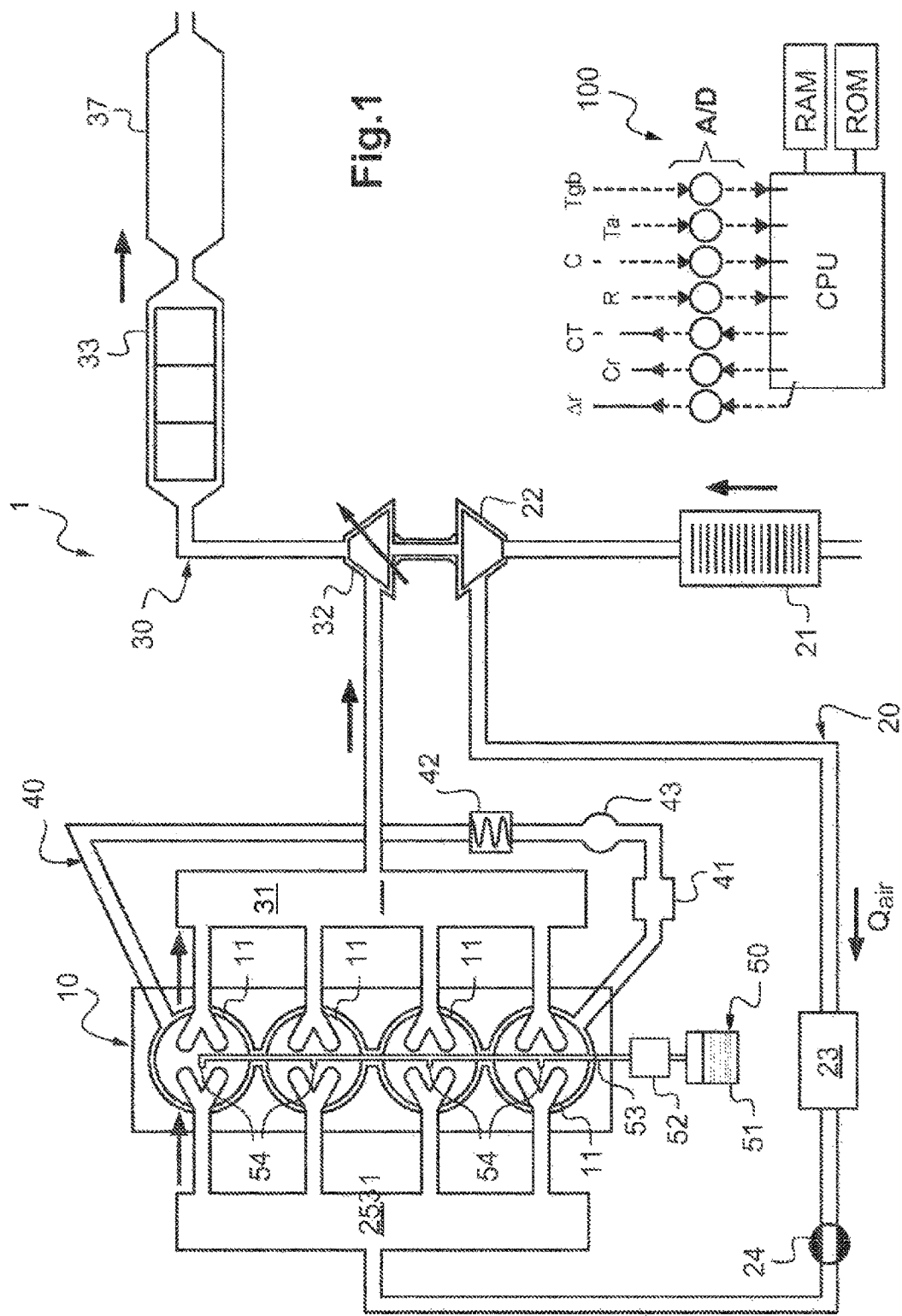
FIG. 1 is a diagrammatic view of an internal combustion engine according to the invention.

FIG. 1 shows diagrammatically an internal combustion engine 1 of a motor vehicle, which comprises an engine block 10 provided with a crankshaft and four pistons (not shown) housed in four cylinders 11.

This engine here has controlled ignition. It may also have compression ignition.

Upstream of the cylinders 11, the internal combustion engine 1 comprises an intake line 20 which takes fresh air from the atmosphere and opens into an air distributor 25, configured to distribute fresh air to each of the four cylinders 11 of the engine block 10. This intake line 20, in the direction of flow of the fresh air, comprises an air filter 21 which filters the fresh air taken from the atmosphere, a compressor 22 which compresses the fresh air filtered by the air filter 21, a main air cooler 23 which cools this compressed fresh air, and a valve 24 for controlling the fresh air flow Qair, which opens into the air distributor 25 and is referred to below as the "intake valve 24".

At the outlet from the cylinders 11, the internal combustion engine 1 comprises an exhaust line 30 which extends from an exhaust manifold 31—into which the gases which have previously been burned in the cylinders 11 are delivered—to an exhaust silencer 37 which allows expansion of the burned gases before they are evacuated into the atmosphere. It also comprises, in the direction of flow of the burned gases, a turbine 32 and a catalytic converter 33 for treating the burned gases.

The turbine 32 is driven in rotation by the flow of burned gases leaving the exhaust manifold 31, and it allows the compressor 22 to be driven in rotation thanks to mechanical coupling means such as a single transmission shaft.

The internal combustion engine 1 also comprises a line for injecting fuel into the cylinders 11. This injection line 50 comprises an injection pump 52 configured to extract fuel from a reservoir 51 in order to deliver it under pressure into a distribution rail 53. This injection line 50 also comprises four injectors 54, the inlets of which communicate with the distribution rail 53 and the outlets of which open respectively into the four cylinders 11.

The internal combustion engine 1 also comprises a coolant circuit 40 for the engine block 10, which in particular allows circulation of a liquid coolant around the four cylinders 11. This coolant circuit 40 comprises at least one thermostat 41 which imposes a setpoint on the temperature of the liquid coolant, a heat exchanger 42 between the ambient air and the liquid coolant, normally known as the radiator 42, and a pump 43 which allows the liquid coolant to be forced into circulation in the coolant circuit 40.

With regard to the circulation of fluids, when the engine is started, the fresh air taken from the atmosphere via the intake line 20 is filtered by the air filter 21, compressed by the compressor 22, cooled by the main air cooler 23, then burned with the fuel injected into the cylinders 11.

The liquid coolant is set in continuous circulation in the coolant circuit 40 by the pump 43. The liquid is cooled by heat exchange in the radiator 42 to a temperature imposed by the thermostat 41, according to a liquid coolant temperature setpoint CTI.

When leaving the cylinders 11, the burned gases are expanded in the turbine 32, treated and filtered in the catalytic converter 33, then expanded again in the exhaust silencer 37 before being emitted into the atmosphere.

To control the various elements of the internal combustion engine 1, and in particular the four injectors 54, the thermostat 41 and the intake valve 24, a computer 100 is provided comprising a processor (CPU), a random access memory (RAM), a read-only memory (ROM), analog-digital converters (A/D), and various input and output interfaces.

Thanks to its input interfaces, the computer 100 is able to receive, from various sensors, input signals relating to the operation of the engine and the climatic conditions.

In its random access memory, the computer 100 thus stores continuously:
- the instantaneous load C on the internal combustion engine 1,
- the instantaneous speed R of the internal combustion engine 1,
- the ambient temperature Ta, i.e. the temperature outside the vehicle,
- the temperature of the burned gases Tgb, i.e. here the temperature inside the exhaust manifold 31.

The ambient temperature Ta is measured using a temperature sensor situated at the opening of the inlet line 20, downstream of the air filter 21.

The burned gas temperature Tgb is either measured by a temperature sensor or calculated, for example by approximation via a state observer, based on the load C, the speed R and the ambient temperature Ta.

The load C corresponds to the ratio of the work delivered by the engine to the maximum work which could be developed by this engine at a given speed. It is generally approximated using a variable known as the effective mean pressure PME.

The speed R corresponds to the rotation speed of the crankshaft expressed in revolutions per minute.

Here, an operating point of the engine is defined by the pair of values for the load C and the speed R.

As a variation, the operating point of the engine could be defined as a function of additional parameters (for example, as a function of the fresh gas temperature), or as a function of different parameters (for example, as a function of the richness and the fresh air flow Qair passing through the intake valve 24).

Using software and a map (predefined on the test bench) stored in the read-only memory, the computer 100 is able to generate output signals for each operating point of the engine.

These output signals are in particular a liquid coolant temperature setpoint CTI and a richness setpoint Cr for fuel to be injected in the engine.

Finally, thanks to its output interfaces, the computer 100 is able to transmit these output signals to various elements of the engine, in particular the intake valve 24, the injectors 54 and the thermostat 41.

Figure 2:
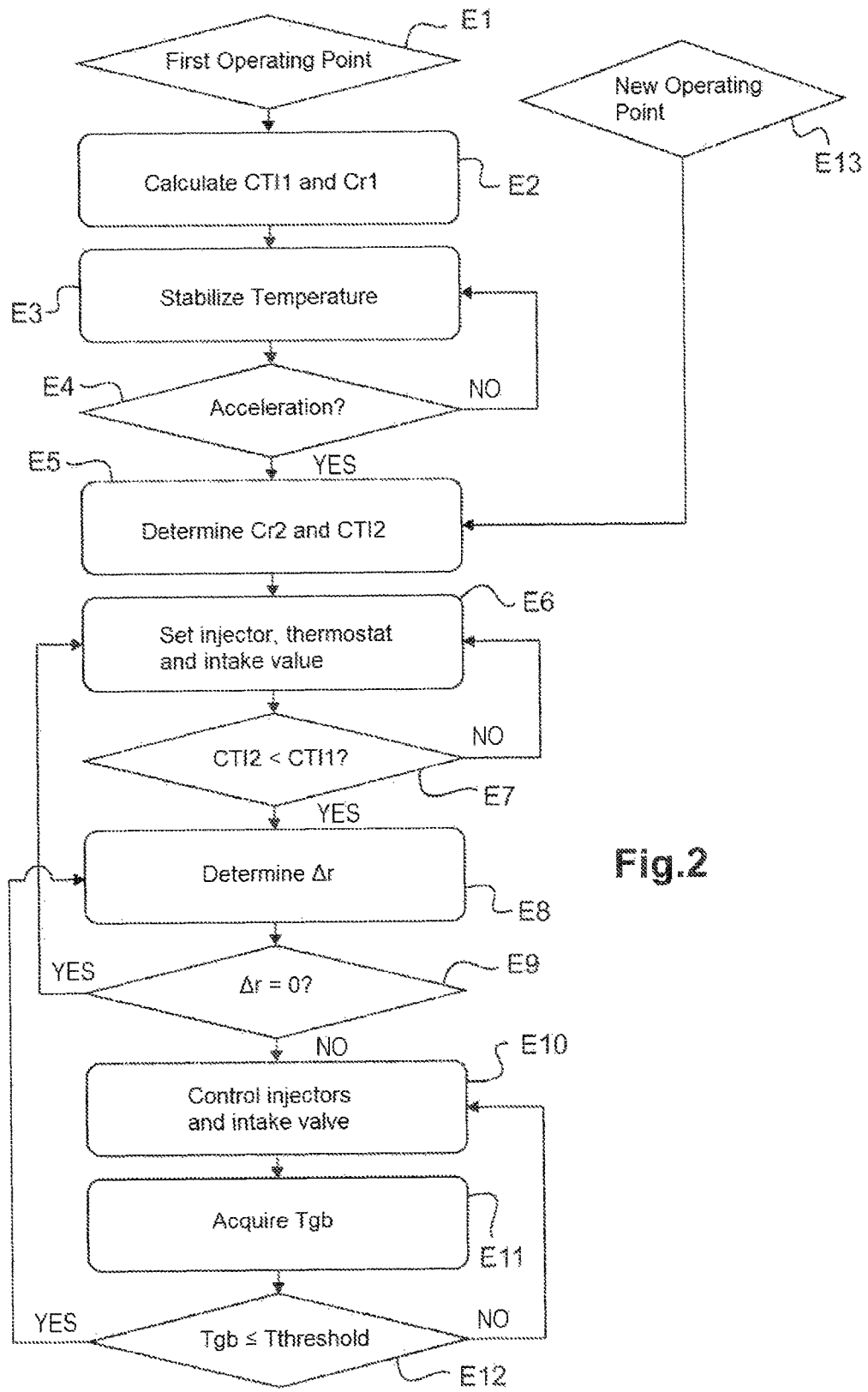
FIG. 2 is a diagram illustrating the steps of the method used to control the internal combustion engine in FIG. 1.

As illustrated on FIG. 2, when the engine of the motor vehicle starts, in order to stabilize it at a first operating point (step E1), the computer 100 calculates the first liquid coolant temperature setpoint CTI1 and richness setpoint Cr1 (step E2).

These setpoints, combined with the two parameters of speed R and torque C characterizing the first operating point, allow control of the thermostat 41, the intake valve 24 and the injectors 54.

The thermostat 41 is in fact controlled so as to stabilize the temperature of the liquid coolant passing through it at the setpoint value CTI1 (step E3).

In practice, this setpoint CTI1 has a value selected from a first set of three separate predefined values (namely 80° C., 90° C. and 100° C.)

However, if the ambient temperature Ta is greater than a threshold temperature (here 40° C.), the setpoint will be selected from a second restricted set (comprising here only the two values 90° C. and 100° C.) so that it remains achievable taking into account the climatic conditions and the performance of the radiator 42.

Here, we consider the case where the first liquid coolant temperature setpoint CTI1 is 100° C.

For their part, the injectors 54 and the intake valve 24 are controlled such that the crankshaft turns at speed R and develops a torque corresponding to the desired load C. The proportion of fresh air taken in and fuel injected into the cylinders 11 is arranged to be equal to the first fixed richness setpoint Cr1.

The computer 100 detects whether action is performed by the driver on the accelerator pedal (step E4).

While no action is taken by the driver on the accelerator pedal, the control setpoints are maintained.

However, if the driver acts on the accelerator pedal, the operating point to be reached changes, and the computer 100 calculates new output signals.

Here we consider the case where the driver wishes to accelerate to a second operating point. The injectors are then set to introduce more fuel into the cylinders 11. In parallel, the intake valve 24 is set to increase the air flow Qair introduced to these same cylinders 11.

To reach the second operating point, the computer 100 determines a second richness setpoint Cr2 and a second liquid coolant temperature setpoint CTI2 (step E5), and sets the injectors 54, the thermostat 41 and the intake valve 24 accordingly (step E6).

In this step E6, there is a risk that the change in operating point will lead to an increase in the burned gas temperature Tgb in the exhaust manifold 31 above a permitted temperature threshold Tthreshold. To limit this temperature rise, the second liquid coolant temperature setpoint CTI2 may be selected at a value lower than that of the first liquid coolant temperature setpoint CTI1. It may for example be selected equal to 90° C.

It is understood that the temperature of the liquid coolant will not fall suddenly, but will diminish progressively depending on the performance of the radiator 42.

Until the temperature of the liquid coolant reaches its setpoint, in order to limit the rise in the burned gas temperature Tgb, the present invention proposes enriching the mixture injected into the cylinders 11 by injecting an additional richness Δr of fuel into the cylinders 11.

Thus according to a particularly advantageous characteristic of the invention, provision is made to perform the following steps:
  determination of an additional richness Δr to be added to the second richness setpoint Cr2,
  acquisition of the burned gas temperature Tgb, and
  progressive reduction of the additional richness Δr as a function of the burned gas temperature Tgb acquired.

More precisely, as FIG. 2 shows, the computer 100 determines whether the second liquid coolant temperature setpoint CTI2 is lower than the first liquid coolant temperature setpoint CTI1 (step E7). If this is not the case (which means that the liquid coolant temperature setpoint CTI does not change or it increases), the elements of the engine continue to be controlled following the second richness setpoint Cr2, according to step E6.

If however the second liquid coolant temperature setpoint CTI2 is lower than the first liquid coolant temperature setpoint CTI1, the computer 100 determines an additional richness Δr of fuel to be injected into the cylinders 11 of the engine (step E8).

This additional richness Δr may be read from a map in the computer or may be calculated (as will be described below in this description).

The computer 100 then determines whether the additional richness Δr of fuel determined in step E8 is zero (step E9).

If the additional richness Δr of fuel determined in step E8 is zero, the elements of the engine continue to be controlled following the second temperature setpoint CTI2 and second richness setpoint Cr2.

If the additional richness Δr of fuel determined in step E8 is not zero, the computer 100 controls the injectors 54 and the intake valve 24 such that the richness of the mixture injected is equal to a richness setpoint Cr which is equivalent to the sum of the second richness setpoint Cr2 and the additional richness Δr (step E10).

The burned gas temperature Tgb is then acquired (step E11) by the computer 100.

The computer 100 then determines whether the burned gas temperature Tgb is less than or equal to a fixed temperature threshold Tthreshold (step E12).

As long as the burned gas temperature Tgb remains greater than this temperature threshold Tthreshold (which means that there is a risk of the engine overheating), the richness Cr of the injected mixture remains equal to the sum of the second richness setpoint Cr2 and the initial additional richness Δr.

However, as soon as the burned gas temperature falls below the temperature threshold Tthreshold (which means that the fall in temperature of the liquid coolant is beginning to have an effect), the aim is to limit the fuel consumption by reducing the value of the additional richness Δr.

To do this, the computer 100 returns to step E8 and recalculates an additional richness Δr.

This new additional richness Δr may be selected equal to the initial additional richness Δr to which a fixed value is assigned.

It may however also be read from a map as a function of the burned gas temperature Tgb (and where applicable also of the load C and the speed R).

It may also be calculated using a proportional-integral-derivative controller PID, the constants of which will have been predefined on the test bench.

Then the computer repeats steps E9 to E12 until the additional richness Δr is zero (case where the coolant circuit is sufficient to cool the engine so that its temperature does not exceed the permitted value).

As soon as the driver again acts on the accelerator pedal, it interrupts the abovementioned process such that the engine reaches a new operating point (step E13). In this case, the computer 100 returns to step E5 of the method.

The method ends when the internal combustion engine 1 is switched off.

The present invention is not limited to the embodiment described and depicted, but the person skilled in the art will be able to add any variant he chooses.

Thus it could be provided that the liquid coolant temperature setpoint CTI is selected from a first set of values comprising more than three values (for example, comprising values 80° C., 85° C., 90° C., 95° C. and 100° C.)

According to another variant, in step E7 it could be provided that the computer 100 compares the new liquid coolant temperature setpoint CTI2 not with the old liquid coolant temperature setpoint CTI1, but with the measured temperature of the liquid coolant.

The invention claimed is:

1. A method for controlling an internal combustion engine, comprising:
   acquiring, at a first operating point of the internal combustion engine, a value of a first characteristic parameter of said first operating point, and from said value a first liquid coolant temperature setpoint in the internal combustion engine and a first richness setpoint of a mixture of air and fuel to be admitted into the internal combustion engine are deduced; and
   acquiring, on passing a second operating point different from the first operating point, the value of said parameter and from the value, second setpoints for temperature and richness are deduced,
   wherein, when the second temperature setpoint is strictly lower than the first temperature setpoint, provision is made to perform the following:
   determining an additional richness to be added to the second richness setpoint,
   acquiring a burned gas temperature, and
   progressively reducing the additional richness as a function of the burned gas temperature acquired.

2. The control method as claimed in claim 1, wherein in the progressively reducing, the value of the reduced additional richness is read from a map as a function of the burned gas temperature.

3. The control method as claimed in claim 1, wherein in the progressively reducing, the value of the reduced additional richness is calculated using a controller as a function of the burned gas temperature.

4. The control method as claimed in claim 3, wherein the controller is a proportional- integral-derivative controller.

5. The control method as claimed in claim 1, wherein each of the liquid coolant temperature setpoints is read from a predefined map.

6. The control method as claimed in claim 1, wherein each of the liquid coolant temperature setpoints is selected from a first set of separate values.

7. The control method as claimed in claim 6, wherein the first set comprises at most five separate values.

8. The control method as claimed in claim 6, wherein the first set comprises three separate values.

9. The control method as claimed in claim 8, wherein the three separate values are 80° C., 90° C. and 100° C.

10. The control method as claimed in claim 6, wherein when an ambient temperature is greater than a predefined threshold, each of the liquid coolant temperature setpoints is selected from a second set of values, a lowest value of the second set being greater than a lowest value of the first set.

11. An internal combustion engine, comprising:
    an engine block;
    an intake line to introduce fresh air into the engine block and provided with a control valve to control a flow of fresh air into the engine block;
    an exhaust line to discharge burned gases from the engine block;
    a line to inject fuel into the engine block and provided with at least one injector to inject fuel into the engine block;
    a coolant circuit of the engine block provided with a thermostat; and
    a computer configured to perform:
    acquiring, at a first operating point of the internal combustion engine, a value of a first characteristic parameter of said first operating point, and from said value a first liquid coolant temperature setpoint in the internal combustion engine and a first richness setpoint of a mixture of air and fuel to be admitted into the internal combustion engine are deduced; and
    acquiring, on passing a second operating point different from the first operating point, the value of said parameter and from the value, second setpoints for temperature and richness are deduced,
    wherein, when the second temperature setpoint is strictly lower than the first temperature setpoint, provision is made to perform the following:
    determining an additional richness to be added to the second richness setpoint,
    acquiring a burned gas temperature, and
    progressively reducing the additional richness as a function of the burned gas temperature acquired, and
    to control said control valve, each injector, and said thermostat according to the setpoints of the liquid coolant temperature and richness, and taking into account said additional richness.

* * * * *